United States Patent [19]

Seltzer

[11] Patent Number: 4,469,711
[45] Date of Patent: Sep. 4, 1984

[54] PROCESS FOR MAKING QUICK-COOKING PASTA

[75] Inventor: Edward Seltzer, Teaneck, N.J.

[73] Assignee: Rutgers Research & Educational Foundation, New Brunswick, N.J.

[21] Appl. No.: 566,182

[22] Filed: Dec. 28, 1983

Related U.S. Application Data

[63] Continuation-in-part of Ser. No. 307,589, Oct. 1, 1981, abandoned.

[51] Int. Cl.³ ............................................. A23L 1/16
[52] U.S. Cl. .................................. 426/557; 426/451
[58] Field of Search ............... 426/557, 451, 96–98, 426/653–654, 508

[56] References Cited

U.S. PATENT DOCUMENTS

| | | | |
|---|---|---|---|
| 328,419 | 10/1885 | Marsh | 426/557 |
| 856,672 | 6/1907 | Best et al. | 426/96 |
| 1,924,826 | 8/1933 | Anderson | 426/448 |
| 2,704,723 | 3/1955 | Poole | 426/557 |
| 2,802,430 | 8/1957 | Filler | 426/448 |
| 2,970,915 | 2/1961 | Ferrari | 426/97 |
| 3,162,536 | 12/1964 | Kaufmann | 426/557 |
| 3,192,049 | 6/1965 | Kinsley | 426/557 |
| 3,846,563 | 11/1974 | Cunningham | 426/557 |
| 3,959,499 | 5/1976 | Harris et al. | 426/97 |
| 4,044,165 | 8/1977 | Baumann | 426/557 |
| 4,098,906 | 7/1978 | Hisaki et al. | 426/557 |
| 4,208,439 | 6/1980 | Hsu | 426/557 |
| 4,230,735 | 10/1980 | Yoshida et al. | 426/557 |
| 4,243,689 | 1/1981 | Kokeguchi et al. | 426/557 |
| 4,368,210 | 1/1983 | Murakami et al. | 426/557 |
| 4,394,397 | 7/1983 | Lometillo et al. | 426/557 |
| 4,423,082 | 12/1983 | Bauernfeind et al. | 426/557 |

FOREIGN PATENT DOCUMENTS

| | | |
|---|---|---|
| 1360933 | 4/1964 | France . |
| 1133407 | 11/1968 | United Kingdom . |

*Primary Examiner*—Raymond Jones
*Assistant Examiner*—Elizabeth A. Hatcher
*Attorney, Agent, or Firm*—Brumbaugh, Graves, Donohue & Raymond

[57] ABSTRACT

Quick-cooking pasta is made by (1) forming a dough comprising flour, water, a carbonate selected from the group consisting of edible alkali metal and ammonium carbonates, and an acidic leavening salt, the dough having a bread dough-like consistency, (2) extruding the dough through an extrusion cooking device under conditions of pressure and temperature sufficient to permit reaction of the carbonate with the acidic leavening salt to produce carbon dioxide and sufficient to at least partially gelatinize the starch in the flour while forming the dough, and (3) drying the extruded formed pasta. A product is provided which will rehydrate within two minutes after addition of water at boiling temperature to provide a high quality cooked pasta.

13 Claims, No Drawings

PROCESS FOR MAKING QUICK-COOKING PASTA

This application is a continuation-in-part of application Ser. No. 307,589, filed Oct. 1, 1981, now abandoned.

This invention relates to a method of making quick-cooking pasta and to a quick-cooking pasta product. More particularly, the present invention provides a novel process for preparing pasta products which uses less energy than prior art processes and needs only a modest investment in equipment to produce a product which is readily dried to storage-stable moisture content. Further, the dried product of the invention will rehydrate within about two minutes after addition of water at boiling temperature to provide a high quality, ready-to-eat pasta.

BACKGROUND OF THE INVENTION

The advent of instant soup mixes and other convenience foods of the dry variety has greatly increased the need for pasta products which will rehydrate within a short time to provide a product ready for immediate consumption.

Pasta products are conventionally made by moistening a mixture of dry ingredients with an amount of water only sufficient for compaction and plasticizing for forming the dough into the desired shape. Typical moisture contents for the dough stage are in the 30–34% by weight range. The dough may then be formed into a homogeneous sheet by successive passages between opposed heavy steel rolls, and the sheet is then continuously cut into noodle or macaroni pieces. Alternatively, extruders are used to form spaghetti and macaroni products. In this case, crumbly dough of about 30–34% moisture is prepared in a vacuumized mixer, and the product is then fed to an extruder. The extruder is specially designed so as not to have a progressive cross-sectional area reduction. The purpose of this is to provide conditions during extrusion whereby the relative natural dispositions of the gluten and starch components of the flour, as well as their chemical and physical integrity, are largely maintained by avoiding arduous shearing and heating during extrusion. Mechanically generated heat is removed by cooling the extruder barrel to minimize protein coagulation and starch gelatinization. The pasta mass is shaped to spaghetti or macaroni forms by auguring it under pressure through die apertures.

Products formed using the above-described prior art process require elaborate drying methods to insure that physical instabilities do not develop in the pasta during drying. Rapid moisture removal, as by using high temperature or low humidity convective air flow, sets up stress within the pasta, and checking or cracking of the product during cooking results. Conventional pasta making procedures preserve rawness, cell-integrity and nondispersion of protein and starch; conventional cooking times range from 8 to 10 minutes in actively boiling water.

Recent prior art methods for making a quickcooking pasta have adopted a number of approaches to the problem. U.S. Pat. No. 2,704,723 to Poole describes a process wherein the macaroni product is precooked prior to drying. The product requires a cooking time of 8–15 minutes and the cooked product is reported to have a slimy surface. In another approach, U.S. Pat. No. 3,192,049 to Kimsley et al. makes a dough containing hard wheat flour and added protein in the form of soy flour or wheat gluten. The dough is extruded, gelatinized by water or steam cooking, and dried. These products have a number of disadvantages including a complicated drying procedure, an undesirable flavor attributed to the high level of protein and a cooking time of 4–12 minutes in water at 97°–100° C.

U.S. Pat. No. 3,846,563 to Cunningham describes still another approach, where quick-cooking macaroni products are made using a precooked flour. The process described, while providing good quality products having a short cooking time, has the disadvantage of requiring relatively large amounts of energy.

More recent prior art processes are described in U.S. Pat. Nos. 4,098,906 to Hisaki et al. and 4,208,439 to Hsu. Hisaki et al. makes quick-cooking noodles with an aqueous emulsion of edible oil, heating the coated noodles with steam, and drying. Hsu makes an instant noodle by forming a sheet of gelatinized flour dough, subjecting the sheet to microwave energy to create therein pores of controlled size, shaping the pieces and drying. Each of these prior art processes require large amounts of energy, and the Hisaki process has the additional disadvantage of providing a product with a substantial oil content, which makes it unsuitable for many purposes.

SUMMARY OF THE INVENTION

It has now been found that a quick-cooking pasta product may be prepared by combining flour, water, a carbonate selected from the group consisting of edible alkali metal and ammonium carbonates, and an acidic leavening salt, to form a dough, and by thereafter extruding the dough under conditions of pressure and temperature sufficient to permit reaction of the carbonate with the acidic leavening salt or other acidic material in the dough to produce carbon dioxide, while at the same time at least partially gelatinizing the starch in the flour. The dough is then immediately extruded to form the dough into the desired shape. The extruded and formed product is then dried to a storage-stable moisture content. Extrusion cooking of the pasta product in this manner is accomplished using less energy and less equipment than prior art processes require, and in addition, the subsequent drying may be conducted under less critical conditions and over a shorter period of time. Furthermore, a product is obtained which can be reconstituted in water in approximately two minutes to provide a highly satisfactory reconstituted pasta which has the further advantage of maintaining its good eating qualities over a period of time after reconstitution. In other words, it does not disintegrate into a pasty mass as do many instant pastas after standing in a rehydrated form for a short period of time.

DESCRIPTION OF THE INVENTION

The basic ingredients which can be used in the instant pasta of my invention include the dry ingredients flour, edible alkali metal carbonate such as sodium bicarbonate, and an acidic leavening salt. Certain of the carbonates require encapsulation for effective performance. An extrusion aid is an optional and preferred ingredient, as is sodium chloride. In addition, where egg noodles are desired, egg yolk solids are employed. Water is added to the dry ingredients to form a dough.

Any of the normal flours used in making pasta and as required by the standards of identity for pasta may be used in accordance with the present invention. The grade of flour can range in protein content from a 9% farina flour to gluten gum fortified flour having up to 13% protein. Of the various types which may be employed, it has been found that a higher starch content flour is less desirable because the final product tends to have a more chewy texture. When preparing egg noodles, for example, extra fancy durum flour gives a finished noodle with a deep, rich, golden color and is thus desirable. If a durum bran-fortified flour is used, the product has a characteristic brown color and the characteristic flavor of bran. Semolina, a coarse particle flour conventionally used to contribute a good color to pasta, is satisfactory; in general, most flour used in conventional pastas can be used in the product and process of the present invention.

Where egg yolk solids are employed in egg noodles, the standards of identity normally require that the ingredient be present at a level of at least 5.5% by weight, expressed as dried egg solids present in the finished dry weight of the product. The egg solids can be supplied either as fresh eggs, dried egg yolk, liquid eggs, or frozen eggs. In addition to providing a desirable color and protein content to the product, the egg yolk solids serve several additional functions. In preparing the dough, for example, it is advantageous to predisperse egg yolk solids in a portion of the water to form a thick slurry. This slurry is then added to the flour with subsequent improvement in the wetting characteristics of the flour during mixing. The moisture distributes more evenly. Further, addition of the acidic leavening salt and encapsulated carbonate to the egg solids slurry improves their distribution in the dough. The encapsulating material on the carbonate particles, when used, prevents premature reaction between the carbonate and the acid. However, when the reaction does occur within the heated extruder, it is apparently more efficient owing to the contiguity of the moistened carbonate and acid. Because of this increased efficiency, a reduced amount of acid may be used to provide a desired degree of porosity in the final product. It is convenient also to dissolve the sodium chloride in this slurry of egg yolk in water; adding the sodium chloride crystals directly to the flour does not insure that they will dissolve and some salt crystals persist in the dried product.

The extrusion aids which may be used according to this invention include materials such as glyceryl monostearate. One suitable material is sold under the trade name MYVAPLEX 600 by the Eastman Chemical Products, Inc. MYVATEX mighty soft softener, powdered distilled monoglyceride prepared from an edible vegetable oil and sold by Eastman may also be used. Up to 2% of these materials, based on the weight of dry ingredients of the dough, may be used in the formulations of the present invention, and they are employed to improve dough handling characteristics during the extrusion process.

Sodium chloride is used as an optional ingredient and may be added up to the level of about 5%, based on the weight of dry ingredients of the dough, depending upon the amount required for seasoning purposes.

The carbonate selected from the group consisting of edible alkali metal and ammonium carbonates used in accordance with this invention may be sodium bicarbonate, ammonium carbonate, ammonium bicarbonate, potassium bicarbonate or other edible alkali metal carbonates or bicarbonates.

Most of the carbonates that are useful according to this invention require encapsulation to prevent premature reaction of the carbonate with acid during dough preparation steps. Of these, sodium bicarbonate is preferred. The preferred level of the sodium bicarbonate, disregarding the weight of encapsulating material, is about 0.5 to 1.0%, based on the weight of dry ingredients of the dough. Expressed in terms of the encapsulated product, the preferred level is about 1-2%.

Certain carbonates, namely ammonium carbonate and ammonium bicarbonate, function without encapsulation. Thus, in some formulations where the presence of encapsulating material is not desired, as when it contributes to an undesirable off-flavor, the use of ammonium carbonate or ammonium bicarbonate is preferred.

The manner in which the reaction between the carbonate and the acidic leavening salt increases the quick-cooking properties of the final product is not fully understood. It is thought, however, that reaction between the carbonate and acid during the extrusion cooking step causes the formation of tiny open spaces, sometimes termed vacuoles, in the final product which facilitates rapid water penetration during rehydration. It is also thought that the presence of the acidic leavening salt and carbonate promote gelatinization of starch by reducing the temperature required for gelatinization. Regardless of the mechanism involved, it has been established that extrusion cooking of the pasta without the carbonate ingredient provides a product which rehydrates incompletely and which has hard uncooked centers.

The carbonate is encapsulated with edible, water insoluble materials such as hydrogenated vegetable fats having a melting point in the range of about 50°–75° C. One preferred material is hydrogenated soybean oil having a melting point of about 65° C., and this material is combined with the bicarbonate as a coating for the particles to provide a free-flowing powder containing 45–50% sodium bicarbonate. The purpose of encapsulation is to prevent premature leavening reaction because of contact with acid during the dough mixing stage. The conditions of extrusion cooking produce elevated temperature and pressure, as well as intensive shearing of the particles within the extruder. These conditions cause release of the carbonate from the encapsulating fat for reaction with the acid.

The carbonate has also been encapsulated with a film of edible protein, such as egg albumen, with success. To reduce an aftertaste thought to be caused by a saponification reaction between the carbonate and fats in the dough from either the encapsulation fat, egg yolk, or other sources, a carbonate has been coated with egg albumen. Thus, in one embodiment, spray dried egg albumen solids are mixed with water sufficient to form a paste in a mortar, and ammonium bicarbonate is intimately mixed into the paste with a pestle. Alternatively, fresh or liquid egg albumen thawed from frozen liquid egg albumen may be used. The paste is then mixed with reasonable promptness with flour in a blender and the balance of the dough ingredients then mixed. In this manner, it is thought that the protein forms a barrier which prevents or minimizes unwanted saponification reaction with the carbonate.

The acidic leavening salts which are useful according to this invention include sodium acid pyrophosphate, sodium aluminum sulphate, sodium aluminum phosphate, potassium acid tartrate, and monocalcium phosphate monohydrate, $CaH_4(PO_4)_2.H_2O$. While these acidic substances are known to react with basic carbonates at different rates during baking, it has been found that under the shear, heat and pressure conditions within the extruder, the reaction rate for each of these acid materials is the same. Of these acidic leavening salts, monocalcium phosphate monohydrate is preferred, because its major reaction product, disodium phosphate, is fully compatible with prepared pasta.

The monocalcium phosphate monohydrate, if unreacted, imparts a residual sour aftertaste to the finished pasta. For that reason, it should be used at a level designed to insure its complete reaction. It has been found that natural acids in other pasta ingredients help to neutralize the carbonate and consequently the provision of the monocalcium phosphate monohydrate at a level at about one-half the stoichiometric amount required to neutralize the carbonate present is usually sufficient to obtain the desired quick-cooking properties in the product without undesirable sour aftertaste being present. The preferred level is about 0.25 to 0.75% by weight of the dry ingredients in the dough.

The ingredients described above are preferably formed into a dough and the dough thoroughly mixed prior to the extrusion cooking step of the present invention. The dough is most conveniently made by first mixing the flour in a planetary dough mixer with an aqueous slurry containing an encapsulated carbonate selected from the group consisting of edible alkali metal and ammonium carbonates and the acidic leavening salt component together with egg yolk solids, if used. When sodium chloride is used in the formulation, it is preferably first dissolved in the aqueous slurry of egg yolk, before mixing with the balance of the dough. A dough is then formed of bread dough-like consistency containing about 35-41% moisture. It has been found that the high moisture dough extrudes better under the high temperature conditions of the present invention than does the drier, crumbly dough of 30-33% moisture which is typical of conventional pasta manufacture.

After preparation of the dough, it is then passed through an extrusion cooking apparatus. One suitable apparatus is a laboratory extruder cooker Model 2003, C. W. Brabender Instrument Company, Inc., S. Hackensack, N.J., having a screw length of 15 inches and a compression ratio of 3:1. The cooker was provided with three separate temperature zones, two on the barrel and one at the die, and suitable operation conditions include a screw speed of 140 R.P.M. with temperature in two zones of the cooker of 150° C., and 115° C. at the die. A suitable range of cooking temperatures at elevated pressures is about 115°-160° C. Another suitable temperature profile is 110° C., 150° C. and 140° C., the latter being the temperature at the die exit. Dough passing toward the die orifice has a temperature measured at 137°-138° C. under these conditions.

One die which is suitable for use provides a 1 inch ribbon extrudate and by inserting evenly spaced wire separators in the die parallel to the direction of flow, it can be made to extrude several noodle ribbons of narrower width. The height of the aperture is typically 0.025 inches, and the width is about 0.25 inches.

The dough may be fed into the extruder by hand. The exiting extrudate has the appearance of a band of toothpaste, and may be cut into strips about one inch long. Time of passage through the extrusion cooking system may be in the range of 11-15 seconds.

Much of the moisture in the dough is flashed off from the extruded pasta ribbon as it leaves the die orifice, the moisture content typically being reduced to about 30%. This constitutes a reduction of about 20-25% of the moisture in the feed.

The extrudate may then be deposited on a screen or perforated metal tray and dried in a conventional flowing hot air dryer at 65°-75° C. for 30-45 minutes to a final moisture content of 9-11% by weight.

Examination of the dried product under magnification discloses that it contains voids, vacuoles, and numerous small tunnel-like openings parallel to the direction of extrusion, all of which are evidence of the formation of gas pockets which form during the extrusion cooking process. Furthermore, no discreet starch grains are visible, thus evidencing a substantially complete gelatinization of the starch content of the flour. This has been confirmed analytically. To the naked eye, however, the product has an appearance similar to that of conventional dense pasta, and it is not conspicuously puffed as in the case of expanded cereal snacks.

Upon reconstitution in freshly boiled hot water for two minutes followed by decanting of the water, the instant pasta of the invention provided a product which was slightly chewy but ready to eat and which maintained its integrity without disintegrating.

The invention will be further described with reference to the following specific examples:

EXAMPLE 1

A dry mix of the following ingredients was prepared:
200 grams of durum patent flour
12.0 grams of egg yolk powder (containing 2% sodium silico aluminate to prevent caking)
4.3 grams of glyceryl monostearate (MYVAPLEX provided by Eastman Chemical Products, Inc. containing 90% or more monoester)
7.0 grams of sodium chloride
4.0 grams of fat encapsulated sodium bicarbonate (containing 50% $NaHCO_3$ coated with partially hydrogenated soybean oil having a melting point of about 65°-66° C.)
1.0 gram of monocalcium phosphate monohydrate (food grade, Stauffer Chemical Company).

After preparing a dry mixture of the above ingredients, a dough was prepared by adding 103 ml. of tap water at room temperature by blending intensively in a planetary batch mixer using a flat blade paddle. After mixing for four minutes, a dough of bread dough-like consistency containing 37-39% water was obtained.

The dough was then fed to an extruder cooker which was a C. W. Brabender Model 2003 (Prep Center) having a ¾ inch diameter screw, an effective screw length of about 15 inches with a length to barrel diameter ratio (L/D) of 20:1. The barrel was rifled straight horizontally to favor more mixing shear. There were two heating zones in the barrel or jacket, electrically heated and with automatic compressed air flow supply for temperature modulation control of the barrel jacket temperature. An electrically heated die was attached, also controllable for temperature. The three heater zones were controlled via thermocouples inserted through barrel or die borings. The die orifice was a 0.025 inch slit, about one inch wide, for producing a continuous pasta ribbon of these two dimensions. The orifice channel was subdivided by inserting in the open slit several parallel wire dividers, which produced thereby 4 parallel narrow pasta ribbons, about ¼ inch wide. Typical capacity was 10-14 lb. of dough per hour. Residence time was 7 seconds when first starting with an empty barrel and die entry orifice and up to 10-15 seconds when at a steady state at a rotary screw speed of 140 R.P.M. Compression ratio within the flow space of the barrel was 3:1 by widening of the shaft diameter in the direction of the discharge die. While operating pressure may vary between 150–500 psig, a pressure of 200 to 250 psig measured behind the die orifice was employed in this example.

With the temperatures of zone 1 and zone 2 controlled at 150° C. and the die temperature controlled at about 115° C., the dough was continuously fed to the extruder cooker to provide a residence time in the cooker of about 10–15 seconds. Upon extrusion, the dough expanded to provide noodles of toothpaste-like appearance. The product was then dried on expanded metal tray surfaces in a cross-circulation flowing hot air dryer at 68°–74° C. for about 40 minutes.

Reconstitution of the dried product was accomplished by simply stirring the product in freshly boiled water and allowing it to stand for 1–2 minutes. Upon evaluation, the rehydrated noodle was found to be uniformly moist, intact, and it remained in that condition without evidencing a mushy, milky, or spalled appearance for up to two hours after hydration.

Examination of the dried noodle product under magnification shows that it has conspicuous puffing or entrapment of elongated tubular vacuoles. Without magnification, it resembles the uniformity and translucency of dense stained glass. The dried product is not conspicuously puffed, the porosity being apparent mainly under magnification.

EXAMPLE 2

A dry mix of the following ingredients was prepared:
200 grams of durum semolina flour
12.0 grams of egg yolk powder (containing 2% sodium silico aluminate to prevent caking)
4.3 grams of glyceryl monostearate (MYVAPLEX)
7.0 grams of sodium chloride
4.0 grams of fat encapsulated bicarbonate (as used in Example 1)
1.0 grams of sodium aluminum phosphate (food grade, Stauffer Chemical Company).

To prepare the dough, the egg yolk powder was slurried in 50 ml. of tap water at room temperature. After a uniform slurry was obtained, the sodium chloride was dissolved in the slurry, and the encapsulated bicarbonate and sodium aluminum phosphate were then added to the slurry. The slurry, with an additional 53 ml. of tap water, was then added to the flour with mixing in a planetary batch mixer using a flat blade paddle. After mixing for four minutes, a dough of bread dough-like consistency containing 37–39% water was obtained.

The dough was then fed to an extruder cooker in the manner described in Example 1, and the extruded product was dried, also in the manner of Example 1. The noodles obtained had the appearance of conventional egg noodles. Examination under magnification shows that each has conspicuous tiny elongated tubular vacuoles which are located substantially parallel to the direction of extrusion. Without magnification, the product resembles conventional pasta in appearance. On adding to it freshly boiled water and permitting it to stand for two minutes, reconstituted noodles are provided having excellent eating characteristics.

EXAMPLE 3

Batches of noodles were prepared according to Example 1, in which each of the following ingredients were substituted:

For the flour component, a mixture containing equal parts of winter wheat flour and durum flour; for the egg yolk powder, a powder containing no anti-caking agent.

In the case of each of these variables, the dry mixture was made into a dough, and the dough extruded in an apparatus following the procedure and under the conditions described in Example 2. The noodles obtained were added to freshly boiled water, and allowed to stand for 2 minutes to provide a reconstituted product of excellent eating characteristics.

EXAMPLE 4

A product was made according to Example 1 in which the sodium chloride was omitted and in which only 100 mls. of tap water were employed to prepare the dough. In this case, the moisture content of the dough was in the 35–37% moisture range.

To the noodles obtained was added freshly boiled water and the mixture was allowed to stand for 2 minutes, whereupon a reconstituted noodle product of excellent eating characteristics was provided.

I claim:
1. A process for making quick-cooking pasta comprising the steps of:
   (a) combining flour, water, a carbonate selected from the group consisting of edible ammonium carbonate and edible encapsulated alkali metals and an acidic leavening salt, to form a dough,
   (b) extruding the dough through an extrusion cooker under conditions of pressure and temperature sufficient to permit the carbonate to react with the acidic leavening salt and to at least partially gelatinize the starch in the flour while forming the dough, and
   (c) drying the extruded formed pasta.

2. The process of claim 1, wherein the carbonate contained in the dough is encapsulated in hydrogenated vegetable oil having a melting point in the range of about 50° to 75° C. and wherein the extrusion conditions comprise an elevated pressure and a temperature in the range of about 115°–160° C.

3. The process of claim 1, wherein the acidic leavening salt is monocalcium phosphate monohydrate, and the carbonate is sodium bicarbonate, encapsulated in soybean oil, hydrogenated to a 65°–66° C. melting point.

4. The process of claim 1, wherein the acidic leavening salt is sodium aluminum phosphate.

5. The process of claim 1, wherein the carbonate is selected from the group consisting of ammonium carbonate and ammonium bicarbonate.

6. The process of claim 1, wherein the dough leaving the extrusion cooker is substantially completely gelatinized.

7. The process of claim 3, wherein the monocalcium phosphate monohydrate is present at a level of approximately one-half the stoichiometric amount needed to neutralize the carbonate in the dough.

8. The process of claim 1, wherein the dough has the consistency of bread dough and contains about 35–41% water.

9. A process for making quick-cooking pasta comprising the steps of:
   (a) forming a dough containing about 35–41% water, from dry ingredients comprising flour, about 1–2% sodium bicarbonate encapsulated in hydrogenated vegetable oil having a melting point of about 50°–75° C., up to 2% glyceryl monostearate, and 0.5 to 1% monocalcium phosphate monohydrate, the % being by weight of the dry ingredients in the dough, (b) passing the dough through an extrusion cooker under elevated pressure at a temperature in the range of 115°–160° C. to release the bicarbonate from its encapsulation and permitting it to react with the monocalcium phosphate monohydrate in the dough to produce carbon dioxide and to at least partially gelatinize the starch in the flour while forming the dough, and (c) drying the extruded formed pasta.

10. A process for making quick-cooking egg noodles comprising:

(a) preparing a dough containing flour, egg yolk solids, sodium chloride, an extrusion aid, encapsulated sodium bicarbonate, and monocalcium phosphate monohydrate, (b) passing the dough through an extrudercooker under pressure and at a temperature sufficient to release the sodium bicarbonate from its encapsulation, permitting it to react with the monocalcium phosphate monohydrate in the dough to produce carbon dioxide and to at least partially gelatinize the starch and the flour while forming the dough, and (c) drying the extruded, formed pasta.

11. The process of claim 10, wherein the dough is of bread dough-like consistency having a moisture level of 35–41%, the sodium bicarbonate is encapsulated in about equal amount, by weight, of hydrogenated soybean oil having a melting point of 65°–66° C. and the encapsulated bicarbonate is present at a level at about 1–2% by weight of the dry ingredients of the dough, and the leavening acid comprising monocalcium phosphate monohydrate is present at a level at about 0.5 to 1% of the dry ingredients of the dough, the extruding being accomplished at a temperature of about 115°–160° C., under an elevated pressure.

12. A process for making quick-cooking noodles comprising:

(a) preparing a dough containing flour, moisture, egg albumen solids, sodium chloride, an extrusion aid, a carbonate selected from the group consisting of ammonium carbonate and ammonium bicarbonate, and an acidic leavening salt, (b) passing the dough through an extrusion cooker under pressure at a temperature sufficient to release carbon dioide from the carbonate and to at least partially gelatinize the starch in flour while forming the dough, and (c) drying the extruded, formed pasta.

13. The process of claim 12, wherein the carbonate is intimately mixed with an aqueous paste of egg albumen solids prior to mixture thereof with other dough ingredients.

* * * * *